Sept. 19, 1967 G. NAMY ETAL 3,342,472
APPARATUS FOR RECOVERING WASTE GASES FROM A METAL REFINING ZONE
Filed July 17, 1962 2 Sheets-Sheet 1

INVENTORS:
GÉRALD NAMY
JACQUES DUMONT FILLON
BY Kurt Kelman
AGENT

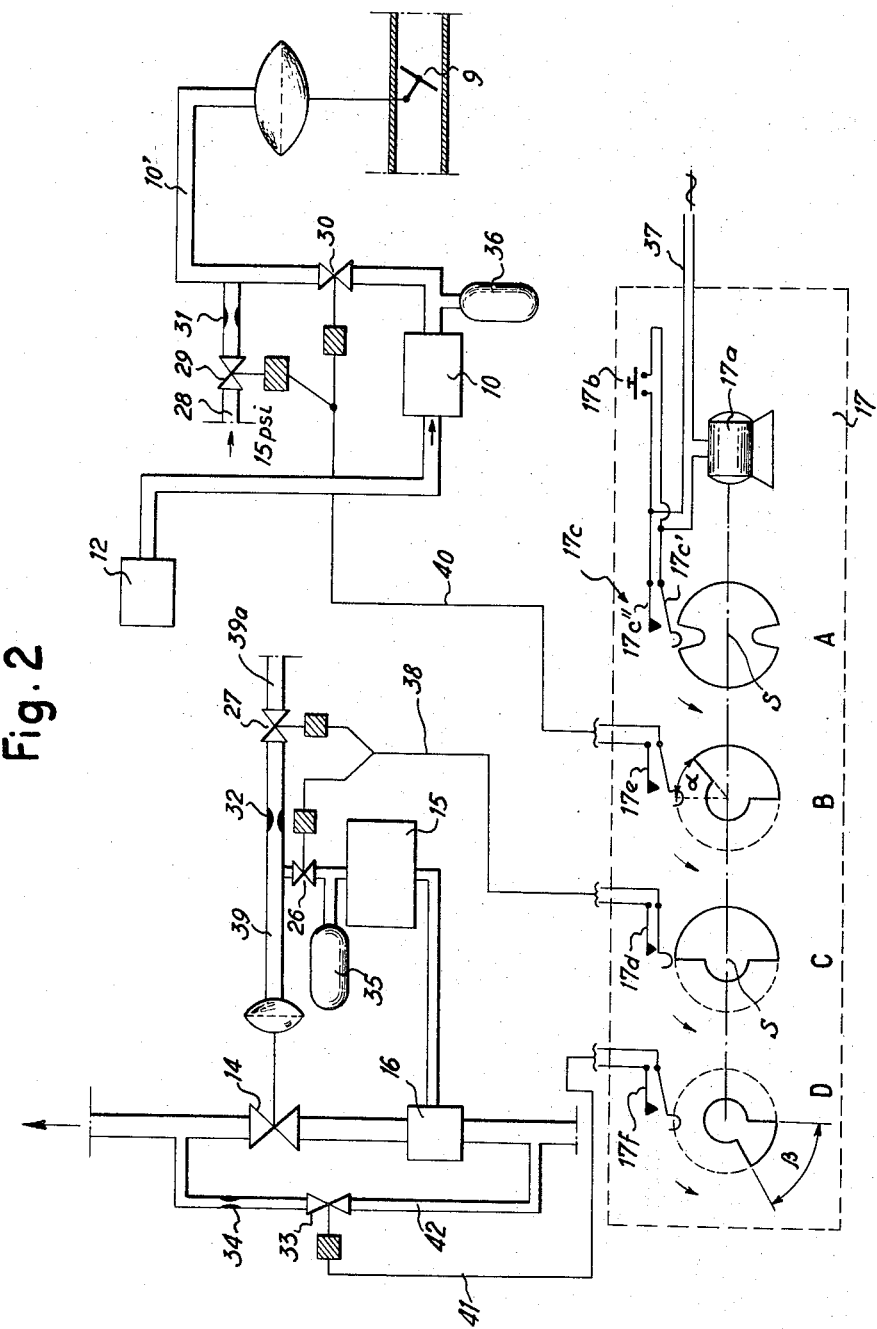

United States Patent Office
3,342,472
Patented Sept. 19, 1967

3,342,472
APPARATUS FOR RECOVERING WASTE GASES FROM A METAL REFINING ZONE
Gérald Namy, Saint-Etienne, and Jacques Dumont Fillon, Metz Queulen, France, assignors to Institut de Recherches de la Siderurgie Francaise, Saint-Germain en Laye, Seine-et-Oise, France, a professional institution of France, and Compagnie des Ateliers & Forges de la Loire (St. Chamond, Firminy, St. Etienne, Jacob Holtzer), St. Etienne (Loire), France, a French company
Original application July 17, 1962, Ser. No. 210,371, now Patent No. 3,190,747, dated June 22, 1965. Divided and this application Mar. 29, 1965, Ser. No. 452,436
Claims priority, application France, July 27, 1961, 869,205, Patent 1,223,518
1 Claim. (Cl. 266—35)

ABSTRACT OF THE DISCLOSURE

A hood spacedly mounted over a converter for recovering waste gases through an exhaust conduit. An exhaust draft control valve is mounted in the conduit and is operated by a pneumatic control circuit. This circuit includes means for determining any pressure differential between the pressure inside the hood and the atmosphere surrounding the hood. Such differential normally causes operation of the valve to equalize these pressures, and a timing unit is operable at the start and the end of each refining cycle, and actuates the pneumatic control to open the valve to its maximum.

---

Figure 1:
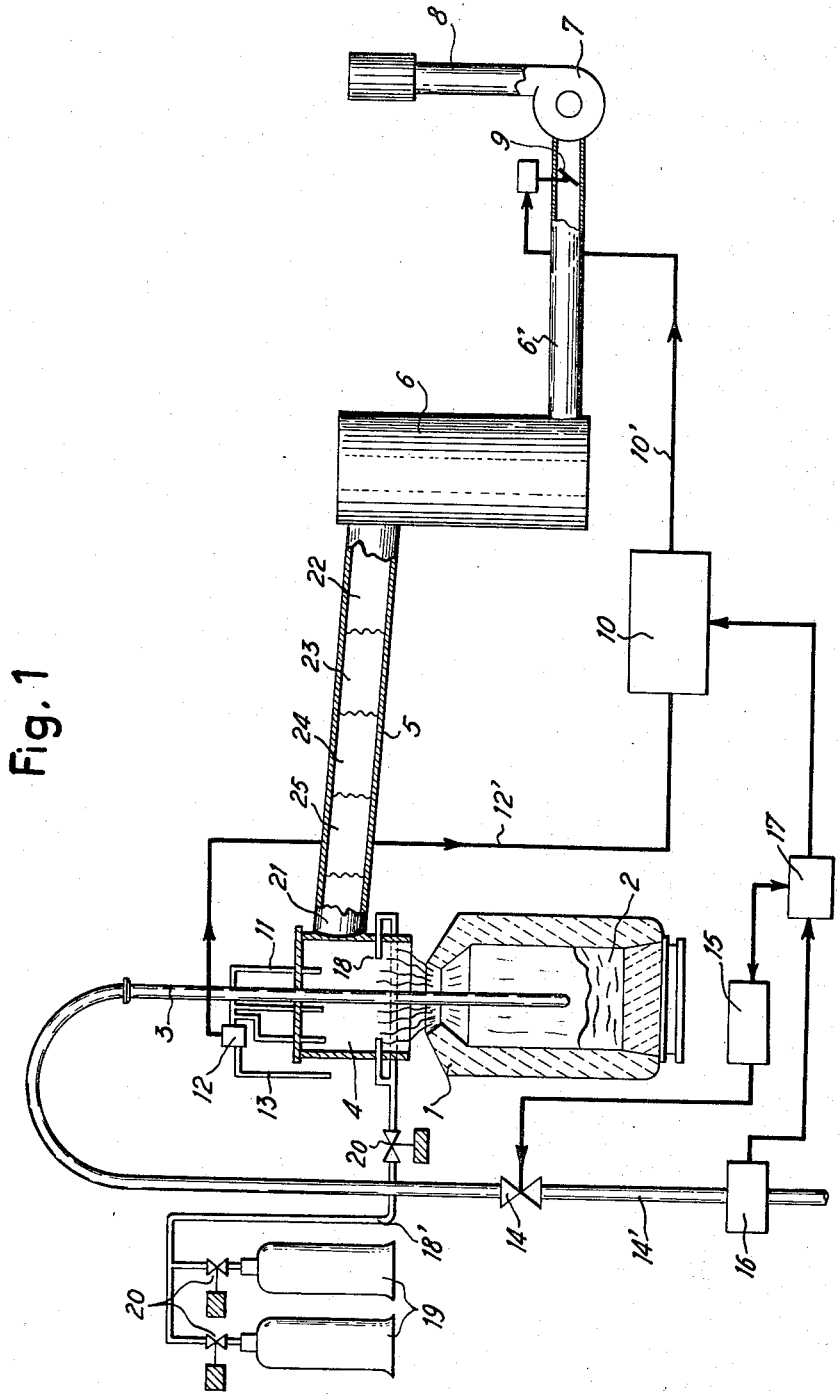

This is a division of our copending application Serial No. 210,371, filed July 17, 1962, now Patent No. 3,190,-747.

The present invention relates to improvements and, more particularly, to safety means in the recovery of waste gases containing a major portion of carbon monoxide and emanating from a metal refining zone, such as a steel converter operating with oxygen.

It has long been acknowledged that advantages would be gained by collecting and recovering in the unburnt state the gases derived from the refining of metals by the pure-oxygen blast method, particularly the gases which pass out of converters in which the oxygen blast is supplied from the top.

Recovery systems of this type are designed to catch the waste gases emerging from the converter and to exhaust the hot gases while they are being cooled in the exhaust conduit. It is known to use for this purpose a gas recovery chamber in the form of a hood which is arranged above and spaced from the converter, the space between the converter and the hood being surrounded by air of the atmosphere and the inside of the hood being in free communication with the atmosphere through this space. The hot gases are then exhausted from the hood through a conduit to a point remote from the hood. The waste gases are cooled in the exhaust conduit without substantial increase in their volume and without being oxidized. Cooling may be effected, if desired, by injecting non-oxidizing cooling gases or atomized water into the hot waste gases, and the cross section of the exhaust conduit is usually rather small. In these known waste gas recovery systems, care is taken to avoid any entry of air from the atmosphere or escape of waste gases into the atmosphere through the space between the recovery chamber defined by the hood and the refining zone defined by the converter. This is done by a known system of pressure gaging and controlling means, which keeps the pressure inside the hood accurately balanced with the atmospheric pressure so that there will be no fluid flow therebetween, this pressure balance being accomplished by the accurate control of the draft in the exhaust conduit. The draft in the exhaust conduit may be created by directional injection of cooling gases, by a conventional exhaust fan or by both, if desired.

In another system, a longitudinally movable sleeve is applied against the converter for the purpose of providing fluid-tightness, the suction within the hood being maintained at a high value. The said sleeve is adapted to slide vertically with respect to the hood so as to permit the movements of the converter to take place outside the blowing periods.

As is known, the major portion of the waste gases emanating from a metal refining zone consists of carbon monoxide. Since these gases rich in carbon monoxide rise from the refining vessel, i.e. a converter, at elevated temperatures, the danger of explosions can be avoided only if formation of explosive CO-air mixtures at any point in the recovery system is avoided. If the exhaust circuit for the recovered waste gases is air-tight, any such possibility is eliminated during the refining cycle since, in effect, the entire system will be filled with CO, and any untimely entry of air into the hood where the waste gases are hottest causes a part of the CO to be oxidized to $CO_2$, thus preventing entry of oxygen into the exhaust conduit. But, at the start and at the end of each refining cycle, the exhausted stream of waste gsaes is not sealed at its two ends, and zones of plain air and zones of plain carbon monoxide, or vice versa, are produced.

It is the primary object of the present invention to prevent the formation of explosive mixtures of carbon monoxide and air in a recovery system of waste gases from a refining zone at the start and at the end of each refining cycle.

This and other objects are accomplished in accordance with this invention by forming a plug of inert gas at each start and each end of each refining cycle in the recovery chamber. This inert gas plug is drawn through the exhaust conduit to separate the waste gas portions saturated with CO from the air.

In accordance with one embodiment of the invention, the inert gas plug or cushion may be formed by the controlled oxidation of parts of the recovered waste gases in the recovery chamber adjacent the hood.

In another embodiment of the invention, this inert gas plug is formed by injecting an inert gas, such as nitrogen, into the gas chamber adjacent said hood.

In this system, the exhaust draft is carefully controlled so that, for a few seconds at the start and at the end of each refining cycle, the exhaust draft is increased sufficiently to cause air from the atmosphere to be sucked into the recovery chamber or hood and there to oxidize CO in a controlled manner to form the plug of inert, i.e. $CO_2$ gas. During the remainder of the refining cycle and in the case of a recovery chamber in the form of a hood spaced from the converter, the exhaust draft is such that the pressures inside the chamber and the surrounding atmosphere are substantially equal. In this manner, the increased draft at the start and at the end of each refining cycle force an inert gas plug or cushion through the exhaust conduit, these plugs separating the waste gas portions saturated with CO from the air of the atmosphere. In the case of a collecting plant with sliding sleeve, it is merely necessary to lift the sleeve at the beginning and at the end of each blowing period for the required length of time. Since the pressure within the hood is always negative, outside air is sucked in, thereby resulting in the combustion of carbon monoxide and the formation of the neutral plug.

Apparatus useful for such a safety gas recovery system includes an exhaust draft control valve means mounted in the exhaust conduit remote from the hood, a pneumatic control circuit arranged to operate the control valve means, and means in the control circuit for determining any pressure differential between the pressures inside the hood and the atmosphere surrounding the hood. Any such pressure differential normally causes the pneumatic control means to operate the exhaust draft control valve means so as to equalize the pressures, and a timing unit is operable at the start and at the end of each refining cycle and actuates the pneumatic control means to open the valve means to its maximum.

The above and other objects, advantages and features of the present invention will be more fully understood when considered in the light of the following detailed description of a preferred embodiment thereof, taken in conjunction with the accompanying drawings wherein FIG. 1 is a schematic side view, partly in section, of a metal refining installation including a system for recovering refining gases without combustion, according to this invention; and FIG. 2 is a more detailed schematic view of the controls of the gas recovery system of FIG. 1.

Referring now to the drawing, and first to FIG. 1, there is shown a conventional steel converter 1 carrying a molten ferrous metal bath 2 which is refined by technically pure oxygen blown into the converter from above by lance 3. The refining gases, including a major portion of carbon monoxide (CO), escaping from the converter are recovered by hood 4 placed above the mouth of the converter. In the illustrated example, the converter has a capacity of five tons and the hood is spaced about 40 cm. above the mouth of the converter. The gases are removed from the hood by exhaust conduit 5, the hood and the conduit being cooled in any suitable manner, for instance by encasing them in a jacket (not shown) through which water or any other desirable cooling medium is circulated.

The recovered gases pass from conduit 5 to a conventional dust separator 6, which usually includes a humid atmosphere, and are removed by an exhaust fan 7 whose intake is connected to conduit 6' coming from the dust separator and whose output delivers the gases to a tall chimney 8 at the top of which the carbon monoxide is burned so that it does not contaminate the atmosphere.

As can be seen from the drawing, the gas passage from hood 4 to chimney 8 is effected in the most direct manner possible and with a minimum of dead zones. The draft or exhausting force of fan 7 is controlled by a damper valve 9 placed in conduit 6' and actuated by a conventional control means 10 connected to valve 9 and so controlling its position that the gas pressure at the lower part of hood 4 always is substantially the same as the pressure of the atmosphere adjacent the lower hood part.

The pressure prevailing in the interior of the hood is measured continuously by a system of three pressure intakes 11 communicating with a differential manometer 12. A pressure intake 13 outside the hood is also connected to said differential manometer which compares the atmospheric pressure with that prevailing inside the hood.

As can be seen from FIG. 1, the pressure inside the hood is not taken in the lower part of the hood so that the intakes are always covered by the hot gases whose pressure it is intended to measure, regardless of fluctuations in the level of these gases during the refining operation.

The differential manometer 12 is connected to the control device 10 and, depending on any pressure differential registered by the manometer, the control device operates the valve 9 to maintain a substantially constant pressure inside the hood and about equal to the atmospheric pressure surrounding the hood. For instance, if the pressure inside the hood falls below the outside atmospheric pressure, the valve 9 will be moved so that it exerts a throttling effect on the gas flow coming from the hood. Contrariwise, if the gas pressure inside the hood rises above the atmospheric pressure, valve 9 will be opened more widely to permit an increased exhaust of the gases. In this manner, the automatic operation of valve 9 under the control of the pressure differential determined by manometer 12 will at all times keep the pressures inside and outside the hood balanced.

The supply of refining oxygen is controlled by valve 14 arranged in oxygen supply pipe 14' which has one end connected to an oxygen supply (not shown) while its other end is connected to lance 3. The control valve 14 is actuated by a known pneumatic control device 15. The rate of the oxygen supply is controlled automatically by a flowmeter 16 of diaphragm type which contains automatic means of adjustment to correct for changes of pressure and temperature, as is well known in the art of feeding fluids from a source to a location of work.

The operation of the control means 10 and 15 is subject to a timing means 17 which intervenes at each start and at each stoppage of oxygen flow to the converter. At each start, the timing means 17 blocks operation of the control means 10 for about 5 to 10 seconds. When the control means does not function, the damper valve is opened to its maximum extent and the pressure inside the hood is, therefore, so low that air from the surrounding atmosphere is sucked into the hood 4 at the same time as the carbon monoxide which emerges from the converter mouth. When it is desired to stop the refining operation, the timing means 17 maintains a reduced oxygen supply by operation of control device 15 and valve 14 while, at the same time, again blocking operation of the control means 10 is effected for a few seconds so as to produce a maximum draft in the exhaust system.

If an emergency stoppage of the oxygen supply is desired, in which case not even a reduced feeding of oxygen to the converter is permissible and the oxygen flow must be cut completely and promptly, massive injections of nitrogen into the interior of the hood 4 are automatically effected. For this purpose, an emergency supply of bottles 19 of nitrogen gas is stored under pressure and connected to injector nozzles 18 mounted in the interior of the hood and connected to the nitrogen supply by conduit 18'. The conduit is normally closed by solenoid valves 20. These valves are connected to a conventional emergency control circuit used in steel plants for stopping oxygen flow to the converter and, upon energization of the circuit, the valves 20 will be opened simultaneously and automatically so as to permit the flow of nitrogen under pressure into the interior of hood 4.

If desired, the valves 20 could also be controlled by the timing unit 17 so that nitrogen is injected at each start and/or each end of each refining cycle.

Since the valve 9 is opened to its maximum at each start and each stoppage of oxygen supply to the converter, which causes a maximum draft in the exhaust circuit from hood 4 to chimney 8, and since the circuit is substantially free of dead spaces and subsequent eddies, a cushion or plug of inert gas is formed and sweeps through the circuit. FIG. 1 shows the approximate configuration of this inert gas plug as it passes through exhaust conduit 5 shortly after the start of the refining operation.

In the drawing, 21 indicates the zone of combustible gases recovered from the convertor without combustion. The zone of atmospheric air, which is pushed by the inert gas plug is indicated at 22. The plug itself is about divided into a first zone 23 containing a mixture of carbon dioxide ($CO_2$), nitrogen and residual oxygen, a second zone 24 containing $CO_2$, nitrogen and traces of CO and O, and a final zone 25 containing a mixture of CO, $CO_2$ and N.

The automatic control system utilized in the present invention is shown more fully in FIG. 2 which shows the timing unit 17 and the pneumatic control circuit. The timing unit is a conventional cam control means with cams rotated by a small electric motor through a reduction gear and operating electrical switches. The motor is started at each start and each stoppage of the oxygen supply to the converter to rotate the cams for half a circle of rotation. The duration of each delay is separately adjustable by displacing the corresponding cam.

As shown in FIG. 2, oxygen is blown into the convertor through oxygen supply conduit 14' wherein there is arranged the flowmeter 16 and the control valve 14. The recovered refining gases, after dust has been removed therefrom, are exhausted through conduit 6' wherein damper valve 9 is arranged to regulate the draft in the exhaust circuit in the manner generally described hereinabove.

As has been stated, the draft in the exhaust circuit is adjusted by a conventional pneumatic control device 10 which is actuated by a conventional differential manometer 12 with pneumatic transmission. The manometer is accordingly connected to the control device 10 by pneumatic line 12' and the pneumatic circuit to valve 9 is completed by line 10' leading from control device 10 to the valve whose damper is moved by the pneumatic pressure in line 10'. The pressure of the compressed air in the pneumatic circuit line 10' may vary between 3 and 15 p.s.i. The device 10 has a fixed control point and, depending on the pressure transmitted to it by differential manometer 12, which again expresses the pressure differential between the inside and outside of the hood 4, the device causes the pressure in line 10' to change so that the damper 9 is opened or closed more or less.

The control device regulating the oxygen flow is a pneumatic device of the same type operating with control air pressures of the same order. The flowmeter 16 is also a conventional device comprising a diaphragm in the passageway of the oxygen, and a differential bell manometer, with temperature and pressure correction. In normal operation, the control device 15 actuates the progressive opening or closing of the valve 14 so as to maintain a constant oxygen supply to lance 3.

The sequential formations of the inert gas plug at the start and the end of each refining period are automatically effected by the timing unit 17 which comprises cams A, B, C and D mounted on shaft S which is rotated by a small electric motor 17a. At each start and stop, the cams are rotated through half a circle, the first half at the start and the second half at the stop. In FIG. 2, the cams are shown in the position at the beginning of the start.

Power is supplied to the motor 17a through an electric circuit 37 connected to a suitable source of electric current and having arranged therein push button switch 17b and control switch 17c comprising a fixed contact and a movable contact. When the push button switch is pressed down, the circuit is closed and the motor rotates shaft S and cam A. As will be obvious from the drawing, rotation of cam A will cause the movable contact 17c' to move into contact with stationary contact 17c'' to keep the circuit closed and thus to cause the motor to rotate the shaft until the cam has completed a half circle rotation. At this point, the cam will permit the spring-biased contact 17c' to revert to its original position, the circuit will thus be opened and the motor will stop, spring-biased push button switch 17b having returned to its original position in the absence of further actuation of this switch. When the push button switch is actuated again, the described cycle will repeat and the cams will be rotated through another half circle.

As will now be described, the delays and sequences of pressure adjustment in the pneumatic control circuit lines between the control devices and the valves are applied by means of solenoid valves actuated by switches operated by the cams of the timing unit 17.

The control valves 9 and 14 respectively regulate the flow of the recovered waste gases from, and of the oxygen supply to, the refining zone, i.e. the converter 1. The pneumatic control circuit for these valves is so designed that its minimum pressure, i.e. a pressure of 3 p.s.i., closes the valves. At the start of a refining cycle, the push button switch 17b is pressed and the motor 17a is thus started. The cam shaft S begins to rotate, and cam C closes switch 17d energizing the electrical conductor line 38 of the electrical control circuit. This causes the normally closed solenoid valve 26 to be opened, and compressed air from pneumatic control device 15 enters the pneumatic control circuit line 39 for opening the oxygen flow control valve 14 to an extent determined by the pressure in the control line 39, this pressure, in turn, being regulated by device 15. The compressed air line 39 has a branch line 39a opening to the atmosphere, and a normally open solenoid valve 27 is arranged between line 39 and branch line 39a so as to regulate air flow from line 39 into the atmosphere. Solenoid valve 27 is also controlled by switch 17d and when the latter is closed to energize electrical circuit line 38, valve 27 is closed while valve 26 is opened. Thus, the pneumatic control line 39 is shut off from the atmosphere when compressed air is supplied thereto from control device 15.

During this same time, the damper valve 9 is kept open to its maximum extent by the necessary control pressure, i.e. 15 p.s.i., in line 10' which receives compressed air from supply conduit 28 through a normally open solenoid valve 29, while being shut off from control device 10 by a normally closed solenoid valve 30. The opening and closing of valves 29 and 30 is controlled by switch 17e in electrical control circuit line 40. When valve 29 is open to admit the maximum control pressure from a suitable source of compressed air and valve 30 is closed, the exhaust draft is at its maximum and causes air from the surrounding atmosphere to be sucked into the hood 4 and through the exhaust circuit. The sucked in air causes the carbon monoxide in the recovered waste gases to oxidize and, thus forms a gas cushion or plug of carbon dioxide which assures the safety of the installation. As shown in FIG. 2, valves 29 and 30 are respectively open and closed when the circuit line 40 is deenergized, i.e. when switch 17e is open. Rotation of cam B will cause the switch to be closed and the circuit line to be energized a few seconds after motor 17a has been started, the time interval depending on the chosen displacement angle $\alpha$ of cam B. Energization of circuit line 40 causes solenoid valve 29 to close, thus shutting off further compressed air supply from the source of maximum pressure through line 28, while it opens valve 30. This connects the pneumatic control line 10' of the damper valve 9 to its pneumatic control device 10 which thus takes over regulation of the extent of the opening of the damper valve in accordance with the pressure it transmits. In this position of the timing unit, with switches 17c, 17d and 17e closed, causing valves 26 and 30 to be open and valves 27 and 29 to be closed, the recovery system functions normally, the oxygen supply to the refining zone and the exhaust of recovered waste gases therefrom is controlled by the pneumatic control of valves 14 and 9, the waste gases are recovered without combustion and the pressure at the base of hood 4 is zero, i.e. its internal pressure is balanced with the surrounding atmospheric pressure.

Push button 17b having been released, half a rotation of cam A causes motor 17a to stop since its control circuit will be interrupted by opening of switch 17c when the cam has turned half a circle.

When it is desired to stop the refining cycle, the electric circuit 37 is energized again by actuation switch 17b, and the cam control unit 17 is operated with its cams running through the second half of their rotational movement. As will be apparent from the illustrated cams, cam B now opens switch 17e which causes solenoid valve 29 to be opened and solenoid valve 30 to be closed, thus again supplying the maximum control pressure to pneumatic line 10' and damper valve 9 which is open to its fullest extent while shut off from regulation by control device 10. The pressure supply line 28 has a calibrated passage 31 which causes the opening of damper valve 9 to be gradual rather than instantaneous.

At the same time, cam C causes switch 17d to be opened, which deenergized electric control circuit line 38 and returns solenoid valve 26 into its normally closed position while solenoid valve 27 is opened to connect the oxygen flow control valve 14 to the atmosphere. Due to the calibrated passage 32 in line 39, the atmospheric pressure will close valve 14 gradually. At the same time, cam D will close switch 17f for several seconds, this time depending on the size of angle β which defines the length of the cam surface. Closing of switch 17f energizes the electric control circuit line 41 and instantly opens the normally closed solenoid valve 33 arranged in the pneumatic bypass line 42 providing a shunt line bypassing flowmeter 16 and valve 14. Due to the calibrated passage 34 in the bypass line line 42, an adjustably reduced amount of oxygen is thus supplied from the oxygen source to the refining zone through the bypass line while valve 14 is closed. During these few seconds of reduced oxygen supply, the carbon monoxide in the waste gases recovered from the slowed-down refining process is oxidized by the excess air sucked into hood 4, this air suction being produced by the increased draft in the exhaust circuit due to the wide opening of damper valve 9. Thus, the safety plug of inert gas is formed again in the exhaust circuit.

Vessels 35 and 36 are arranged in the outputs of pneumatic control devices 15 and 10, respectively, to assure the stability of the pneumatic control circuit.

After the motor 17a of timing unit 17 is stopped at the end of the second half-circle rotation of the cams, the oxygen supply to the converter is cut off, and the damper valve 9 in the exhaust circuit is fully opened. The installation is thus ready for a new refining cycle.

The system in accordance with the invention is readily adapted to plants without draft regulation having a movable sleeve which is applied against the converter so as to ensure fluid-tightness. No special mechanical equipment is necessary for that purpose. Since the pressure is always negative in a plant of this type, it is merely necessary to lift the sleeve for a few seconds at the commencement and at the end of each operation so as to admit air for the combustion of carbon monoxide. The plug of burnt gases which provides for safety of operation. Circuits for producing the necessary time-delays will be designed without difficulty by those skilled in the art, and there is no need to give a detailed description of the corresponding installation. The mode of operation, the formation of the plug and the results obtained are the same as in the example which has been described with reference to the drawing.

It will be readily appreciated that the safety of the waste gas recovery operation is assured by the passage of the inert gas plug through the exhaust conduit ahead of, and behind, the waste gases saturated with CO. The latter are prevented from contacting the air of the atmosphere at the start and at the end of each refining cycle. The controlled admission of air to the recovery hood for the oxidation of carbon monoxide and the corresponding formation of the inert $CO_2$ plug can be readily programmed by the described system. In practice, an inert gas plug of the greatest possible volume will be produced since the plug may well be somewhat diluted with CO, particularly in large recovery systems. The desired volume of the gas plug is obtained readily by causing controlled combustion of CO at the entry to the hood for a time set by timing unit 17. For this purpose, the exhaust draft control and the control of the oxygen flow to the refining zone are so timed that the recovery of waste gases without combustion is slightly delayed with respect to the beginning of the oxygen flow. Similarly, at the end of the refining cycle, partial combustion of CO is effected before the oxygen flow has been completely stopped. During these periods of partial combustion of the waste gases, at the start and at the end of each refining cycle, the controls are so timed that the exhaust draft is increased to force combustion air into the hood and to cause the partial combustion. The resultant inert gas plug contains a major portion of atmospheric nitrogen and $CO_2$ derived from the oxidation of CO. It also contains a little oxygen and CO but in such small amounts that the mixture is not inflammable. If desired, the inert plug may be reinforced by the injection of nitrogen into the hood, which is particularly useful in case of emergency where the oxygen supply has to be interrupted abruptly and there is, therefore, no time for the formation of the inert gas plug by oxidation of CO.

It will be clearly understood that many variations and modifications may occur to the skilled in the art, particularly after benefiting from the present teaching, without departing from the spirit and scope of the invention as defined in the appended claim.

What is claimed is:

An apparatus for recovering waste gases emanating from a converter, comprising a hood spaced from the converter, the space between the converter and the hood being surrounded by air of the atmosphere and said hood being in free communication with the atmosphere through said space, an exhaust conduit leaving said hood, an exhaust draft control valve means mounted in said conduit remote from said hood, a pneumatic control circuit including pneumatic control means arranged to operate the control valve means, said control circuit including means for determining any pressure differential between the pressure inside the hood and the atmosphere surrounding the hood and any such pressure differential normally causing the pneumatic control means to operate the exhaust draft control valve means so as to equalize said pressures, and a timing unit operable at the start and the end of each refining cycle, said timing unit actuating the pneumatic control means to open said valve means to its maximum.

References Cited

UNITED STATES PATENTS 3,118,759   1/1964   Okaniwa et al. _____ 266—35 X

J. SPENCER OVERHOLSER, *Primary Examiner*.

E. MAR, *Assistant Examiner*.